Aug. 2, 1955     K. S. FRASER     2,714,463

REEL TRUCK

Filed Jan. 4, 1954

INVENTOR
KENNETH S. FRASER
BY
Frederick C. Bromley
ATTY.

United States Patent Office 2,714,463
Patented Aug. 2, 1955

2,714,463

REEL TRUCK

Kenneth S. Fraser, Toronto, Ontario, Canada

Application January 4, 1954, Serial No. 402,001

1 Claim. (Cl. 214—620)

This invention relates to reel carriers.

More particularly, the invention concerns an unique arrangement of a reel truck devised to operate in conjunction with a tiering and/or fork lift truck.

It is well-known to mount a reel of heavy cable upon a mobile vehicle for transport to and from one location to another, as for example, to a place where the cable is to be payed-out on a job.

It is also known to mount a reel of cable upon a multi-wheeled vehicle in such a manner that the reel can be rotated about a removable axle so as to pay-out cable therefrom without removing the reel from the vehicle.

Some effect has been expended in the provision of shear-leg cranes and dollies designed to facilitate the handling of these extremely heavy and awkward reels in storage yards and the like and their movement from one place to another.

All of the prior art arrangements, of which I am aware, suffer serious disadvantages. Large multi-wheeled trucks sit high above the road and some means (and very often inadequate means are available) must be provided for hoisting the reel off a storage space into the truck.

Where cable is being payed-out to overhead line poles, the multi-wheel truck performs quite well—once the reel has been installed therein, but for underground cable laying, the multi-wheeled heavy truck is most awkward and unsatisfactory; the truck is essentially relatively large and interferes widely with traffic on a street under which cable is being laid and in congested areas it is often almost impossible to position the truck in the correct line of cable-pull owing to its bulk and clumsiness and due further to interference by essential traffic services.

Some attempts have been made to provide dolly trailers which can be tipped partly under the edge of a reel and then by a series of intricate and not always successful manoeuvres, towed behind a vehicle and then shunted into position over a manhole or the like.

A general object of the invention is to provide a reel truck having side frame members provided with intermediate saddles for an axle bar of a reel and open at an end to receive a reel, the open end being supported on wheels and the other end being supported on a fork of a lift truck by means of swivel connection, whereby the truck frame may be elevated endwise to raise the wheel for transportation.

Another object of the present invention is to provide a cable-reel truck in association with a mobile tiering or fork lift truck in such a combination that a reel can be removed from one place, such as a stock-pile cradled on a wheeled journal support, lifted clear of the floor or ground after cradling, transported without risk of the reel falling off the support, and then, by a very simple manoeuvre of the powered lift truck, exactly position the reel at a desired location or over a specified cable intake point, as the case may be according to the use of the device.

In a further aspect the applicant has discovered that an arrangement of the kind described can be so devised that by manipulating the tiering control of the powered truck, the reel can be grounded at any time to provide friction between the cable drum and the ground so as to provide braking force when it is desired to restrain the movement of the cable during a pay-out operation.

In accordance with these objects a cable reel truck comprises a mobile tiering and/or lifting truck having a tiering fork capable of moving upward and downward under power controlled by an operator, a reel support frame having road contacting wheels supporting one end, means at the other end of said frame cooperating with said tiering fork for raising and for lowering the said other end and journal supports for a cable reel positioned at points on said frame intermediate said ends.

In a further aspect the means co-operating with said tiering fork include a caster arrangement designed to flexibly articulate the two portions of the arrangement to provide ease of manoeuvre.

In a still further aspect the caster support for the said other end is arranged to mount swivelly upon a plinth having recesses designed to receive the tiering fork of a lift-truck.

The invention will now be further elucidated by the following description of a typical example of construction, the text being aided by reference to the accompanying drawings wherein.

Figure 1:
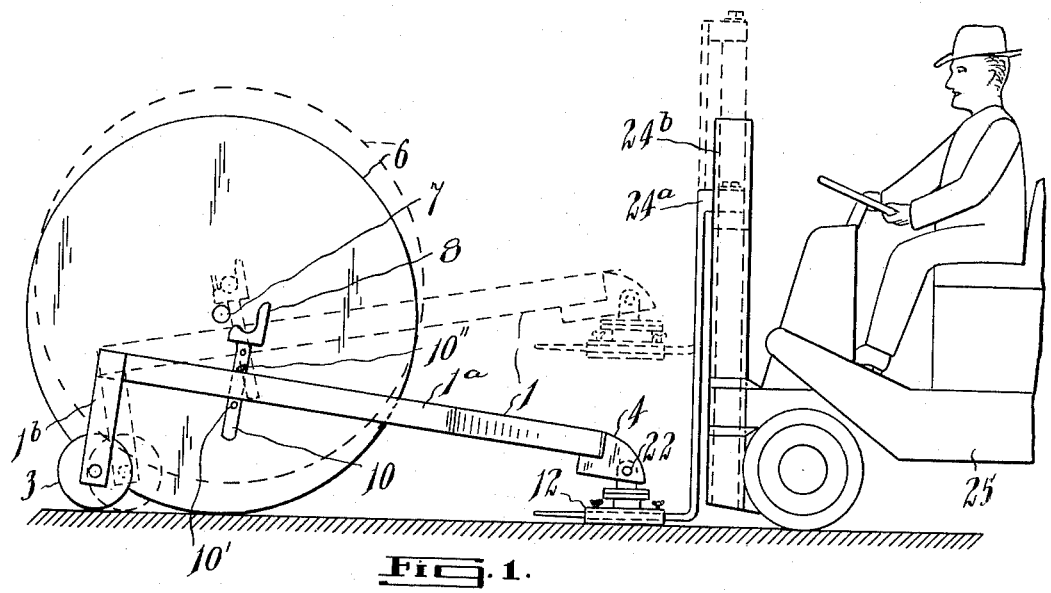
Figure 1 depicts, somewhat diagrammatically, part of a tiering truck, and a reel carrier, swivel joint and plinth and a cable reel about to be grasped and lifted as indicated by the dotted lines.
Figure 2:
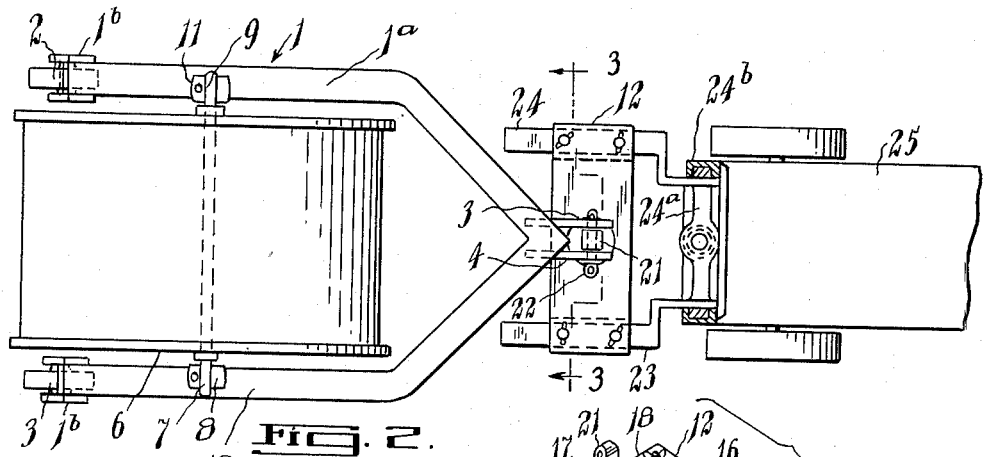
Figure 2 is a view looking down from the top upon the construction envisaged by Figure 1.

Referring now to the drawing, 1 is a framework comprising a reel support structure of fork-like shape and has wheel sets 2, 3, with legs 1b at its forward end and a set of yoke plates or jaws 4, 5 at its apex-like rear end. A material reel 6 having an axle bar 7 is able to be cradled in open journals 8, 9 which terminate journal supports 10. Journals 8 and 9 are in the form of saddles and the supports 10 are in the form of posts slidable vertically in holes in the side members 1a of frame 1. Posts 10 are supplied with a series of diametrical holes 10' for a pin 10'' for vertical adjustment of the saddles 8 and 9.

Figure 3:
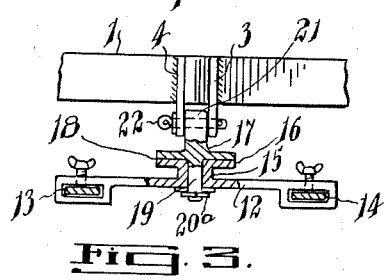
Figure 3 is a cross section on line 3—3 of Figure 2, showing a sectionized caster, a plinth and a reel frame detachably associated therewith.
Figure 4:
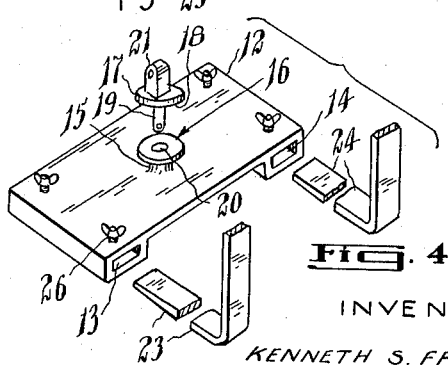
Figure 4 is a perspective fragmentary view of the plinth, caster and fork socket arrangement according to the invention.

A plinth 12 or pallet is preferably a steel casting having two fork recesses 13, 14 and a centrally positioned bearing boss 15 having a flat seating face 16. A spindle 17 has a face 18 machined to mate with face 16 and a spigot 19 designed to sleeve in hole 20 in boss 15. The spigot may be retained in hole 20 by a cotter pin or by a retaining ring or the like, designated 20a, Figure 3.

The bearing spindle 17 terminates in an eye 21 which enters the space between the yoke plates or jaws 3, 4 and is held hingedly captive to the jaws by pintle 22 which is detachable. Pin 22 allows the eye 21 to swing in a vertical plane in the yoke.

The forks 23, 24 of tiering truck 25 are steerable into the apertures 13, 14 respectively when the plinth 12 is resting on any surface within tiering range of truck 25. Pin 22 provides a swivel axis about which the plinth 12 may turn so that it may move with the forks while the frame 1 is canted.

It will now be evident that there has been provided a reel-carrier having double articulation, up and down and sidewise in an infinite number of different attitudes between four quadrantal limits, in association with a tiering and/or lifting truck. Since the spigot allows the plinth to turn from side to side the wheeled frame 1 is dirigibly connected to the fork lift truck.

The tiering truck may now select a reel from a stock pile, using its fork directly, place the reel upon a ground line or other supporting surface common to that of the plinth. The truck then engages the plinth 12 with its attached reel carrier. The forks of the truck may be locked to the plinth by wing clamp screws such as at 26 and the plinth is then raised slightly from the supporting surface so that the reel carrier can be rolled over the supporting surface to bring the open journals 8, 9, under reel axle 7 whereupon the forks are raised until the journals 8, 9 take the weight of axle 7 and lift the reel 6 clear of the supporting surface as shown in the dotted lines of Figure 1.

The reel carrier can be effectively used for unwinding a cable from a reel and in this event, when the cable is being payed-out from the reel on location, the forks can be raised or lowered to suit cable-draught requirements, or the cable reel can be lowered until its edge scrapes the ground thus providing an effective cable reel brake.

By making the journal supports 10, 11 of adjustable length, the carrier can be adapted to deal with cable reels or drums of different diameters, the height of the journals above ground level being always less than one half the diameter of a specified reel so that the journals can always slip under and grasp the axle 7.

From the preceding description it will be manifest that my invention uses a conventional fork lift truck for supporting and elevating an end of a U-shaped reel truck which is open to a reel and supported at its open end on wheels applied to the legs or side members of the bifurcated frame. The well-known fork lift truck comprises a hydraulic mechanism 24a for elevating the forks 23, in a guide frame 24b on the body of the truck 25 which is dirigible. The truck 25 is shown by way of example only.

From the preceding description it will be manifest that the invention provides a highly useful and advantageous lifting apparatus in that the wheels at the forward end serve as a fulcrum for lifting a load such as a reel by means of the use of the fork lifting truck, a distinctive feature being that the wheeled frame with the saddles for the reel serves as a lever which enables the fork lift truck to raise a load far in excess of what it would otherwise be able to do were the load such as a reel be directly applied to the fork element.

It is evident that various modifications can be made in form or shape of frames, forks, journals, bearings and the like without departing from the spirit of the invention and all such modifications are to be regarded as lying within the ambit of the appended claim.

What I claim is:

A material-reel carrier comprising a fork shaped reel support frame, the bifurcation providing an opening at the forward end, wheel sets positioned to support the said frame at the forward open end thereof, a hinging joint positioned to restrain the rearwardly positioned closed end of the said fork-shaped frame but to allow the frame to change its attitude angularly about a pivotal axis, a pallet, a caster having an eye portion forming part of said hinging joint and a swivel bearing portion, means for swivelly journaling said bearing portion upon said pallet to constitute said pivotal axis, means characterising said pallet for receiving the tiering forks of a lift truck, and means positioned upon said frame intermediate the said wheels and said pallet for seating the ends of a bar placed axially through a reel for lifting the same.

References Cited in the file of this patent

UNITED STATES PATENTS

| | | |
|---|---|---|
| 1,587,842 | Knox | June 8, 1926 |
| 1,635,198 | Turner | July 12, 1927 |
| 1,636,850 | Childress | July 26, 1927 |
| 1,921,233 | Kuchar | Aug. 8, 1933 |
| 2,120,042 | Remde | June 7, 1938 |
| 2,362,991 | Dahl | Nov. 21, 1944 |
| 2,459,506 | Dempster et al. | Jan. 18, 1949 |
| 2,616,580 | Olson | Nov. 4, 1952 |
| 2,625,278 | Sensenbaugh | Jan. 13, 1953 |